United States Patent
Buburuzan et al.

(10) Patent No.: US 10,488,862 B2
(45) Date of Patent: Nov. 26, 2019

(54) METHOD FOR COMMUNICATION BETWEEN A CONTROL STATION WHICH EXTERNALLY CONTROLS AN AUTOMATICALLY TRAVELING VEHICLE AND A FURTHER TRAFFIC PARTICIPANT AS WELL AS AN AUTOMATICALLY TRAVELING VEHICLE

(71) Applicant: VOLKSWAGEN AG, Wolfsburg (DE)

(72) Inventors: Teodor Buburuzan, Braunschweig (DE); Bernd Rech, Bokensdorf (DE); Bernd Lehmann, Wolfsburg (DE); Monique Engel, Braunschweig (DE); Sandra Kleinau, Rötgesbüttel (DE); Stefan Gläser, Braunschweig (DE); Hendrik-Jörn Günther, Hannover (DE); Johannes Hartog, Braunschweig (DE)

(73) Assignee: Volkswagen AG (DE)

( * ) Notice: Subject to any disclaimer, the term of this patent is extended or adjusted under 35 U.S.C. 154(b) by 6 days.

(21) Appl. No.: 15/801,395

(22) Filed: Nov. 2, 2017

(65) Prior Publication Data
US 2018/0120854 A1 May 3, 2018

(30) Foreign Application Priority Data
Nov. 2, 2016 (DE) .................. 10 2016 221 480

(51) Int. Cl.
*G01C 22/00* (2006.01)
*G05D 1/00* (2006.01)
(Continued)

(52) U.S. Cl.
CPC ......... *G05D 1/0212* (2013.01); *G05D 1/0022* (2013.01); *G05D 1/0088* (2013.01);
(Continued)

(58) Field of Classification Search
CPC .. G05D 1/0293; G05D 1/0212; G05D 1/0022; G05D 1/088; G05D 1/0287;
(Continued)

(56) References Cited

U.S. PATENT DOCUMENTS

| 2014/0195213 A1 | 7/2014 | Kozloski et al. |
| 2015/0158499 A1 | 6/2015 | Koravadi |

(Continued)

FOREIGN PATENT DOCUMENTS

| DE | 102012021282 A1 | 4/2014 |
| DE | 102014217389 A1 | 3/2015 |

(Continued)

OTHER PUBLICATIONS

Office Action for Japanese Patent Application No. 2017-211725; dated Oct. 22, 2018.

*Primary Examiner* — Mahmoud S Ismail
(74) *Attorney, Agent, or Firm* — Barnes & Thornuburg LLP

(57) ABSTRACT

A method for communicating between an operating point, which externally controls an automatically driving vehicle, and a further road user. The method includes identifying the further road user and setting up a communication connection between the operating point and the further road user.

14 Claims, 3 Drawing Sheets

(51) Int. Cl.
*G05D 1/02* (2006.01)
*G07C 5/00* (2006.01)
*G08G 1/0967* (2006.01)

(52) U.S. Cl.
CPC ....... *G07C 5/008* (2013.01); *G08G 1/096725* (2013.01); *G08G 1/096741* (2013.01); *G08G 1/096775* (2013.01); *B60W 2550/402* (2013.01)

(58) Field of Classification Search
CPC ............. G07C 5/008; G08G 1/096725; G08G 1/096741; G08G 1/096775
USPC ..................................................... 701/23, 24
See application file for complete search history.

(56) References Cited

U.S. PATENT DOCUMENTS

2015/0370255 A1* 12/2015 Harvey .............. B62D 15/0285
                                                            701/24
2016/0189542 A1   6/2016 Myer
2018/0111628 A1*  4/2018 Tamagaki ................ B60Q 1/46
2018/0113476 A1*  4/2018 Giles ..................... B60W 10/04

FOREIGN PATENT DOCUMENTS

| DE | 102013226336 A1 | 6/2015 |
| DE | 102016000555 A1 | 7/2016 |
| EP | 2985571 A2 | 2/2016 |
| GB | 2528953 A | 2/2016 |
| JP | H05143158 A | 6/1993 |
| JP | H0636185 A | 2/1994 |
| JP | 2000233751 A | 8/2000 |
| JP | 2002009946 A | 1/2002 |
| JP | 2003195941 A | 7/2003 |
| JP | 2005157655 A | 6/2005 |
| JP | 2011150516 A | 8/2011 |
| WO | 2016157883 A1 | 10/2016 |

* cited by examiner

METHOD FOR COMMUNICATION BETWEEN A CONTROL STATION WHICH EXTERNALLY CONTROLS AN AUTOMATICALLY TRAVELING VEHICLE AND A FURTHER TRAFFIC PARTICIPANT AS WELL AS AN AUTOMATICALLY TRAVELING VEHICLE

PRIORITY CLAIM

This patent application claims priority to German Patent Application No. 10 2016 221 480.2, filed 2 Nov. 2016, the disclosure of which is incorporated herein by reference in its entirety.

SUMMARY

Illustrative embodiments relate to the communication between automatically driving vehicles and other road users. Illustrative embodiments relate to a method for communicating between an operating point, which externally controls an automatically driving vehicle, and a further road user and to an automatically driving vehicle comprising a communication apparatus.

BRIEF DESCRIPTION OF THE DRAWINGS

Exemplary embodiments are explained in more detail below with reference to the accompanying figures, in which.

DETAILED DESCRIPTION

Figure 1:
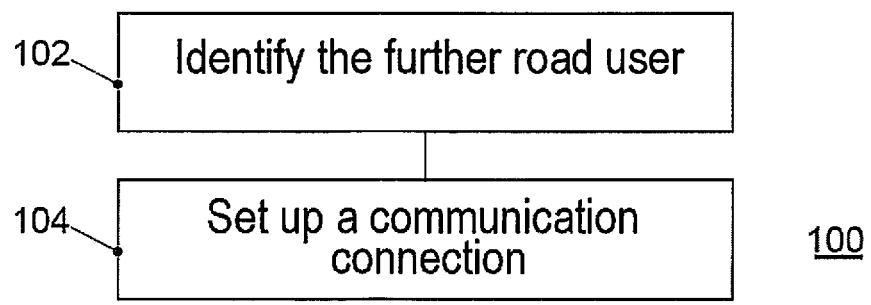
FIG. 1 shows a flowchart of an exemplary embodiment of a method for communicating between an operating point and a further road user.

A vehicle is a mobile method of transport for transporting persons or goods. The vehicle may, therefore, be both a passenger vehicle and a commercial vehicle. For example, a vehicle may be an automobile, a truck, a motorcycle or a tractor. Generally, a vehicle can be interpreted as an apparatus which comprises an engine, a drive train system and wheels.

An automatically driving vehicle moves completely automatically in the public road traffic. For this purpose, an automatically driving vehicle may be equipped with an on-board sensor system for detecting its environment (for example, cameras, laser scanner, radar) and may have the possibility of communicating with other road users or else the infrastructure (for example, backend, roadside infrastructure such as traffic lights). An automatically driving vehicle itself makes decisions on its operational and tactical driving on the basis of the received information and can also cooperate with other road users in its vicinity.

Above a certain degree of automation (for example, above Society of Automotive Engineers (SAE) Level 4), at least some of the vehicles will be en route on public roads without a human driver. Such automatically controlled L4 vehicles will then have to act in so-called mixed traffic in which they must interact with other vehicles with an identical or higher degree of automation (for example, SAE Level 5) or with vehicles with a lower degree of automation or without automation (steered by a human driver in some or all situations). Situations may also occur in which it is necessary to interact with pedestrians.

Although L4 vehicles can manage most traffic situations without human intervention, situations are conceivable in which an L4 vehicle reaches its system limits. For example, the situation could occur in which the vehicle cannot assess the traffic solely on the basis of its own knowledge (for example, because information is missing) or it is not possible to plan a trajectory (to be driven) or a maneuver (L4 vehicle is in a deadlock).

Such a deadlock can be resolved by a command center. A command center is a facility in which a specially trained person or a system having specific capabilities and information can temporarily control an automatically driving vehicle. The command center can supply the deadlocked vehicle with information which can be used by the vehicle to autonomously resolve its deadlock. This may be, for example, information relating to areas which can be used and which have not been identified by the automatically driving vehicle itself. Alternatively, the command center can also transmit trajectories to the vehicle, which trajectories could not be calculated by the vehicle using its own algorithms. If the situation is more complex, the vehicle can be completely controlled by a remote driver in the command center.

Even if a remote driver can control an L4 vehicle from a command center, situations are conceivable in which the remote driver cannot solve a problem alone. These could be, for example, complex situations in which other vehicles are also involved and in which cooperation and/or coordination of all vehicles is required. In such a situation, the command center could not have sufficient information for resolving the situation, for example, because the L4 vehicle cannot provide sufficient information (for example, limits of the sensor perception). A coordinated sequence of the maneuvers of different road users could also be necessary.

For this purpose, the document US 2015/0370255 A1 proposes, for example, that, within a defined control region, a regional authority transmits messages to automatically driving vehicles or vehicles without automation to control the vehicles in the control region and to ensure that predefined rules are complied with in the control region. However, a solution for resolving complex situations between an automatically driving vehicle and a further road user cannot be gathered from the document US 2015/03700255 A1.

The document US 2015/0158499 A1 proposes a vehicle monitoring system. In this case, information is gathered from one or more vehicles. If it is determined that one of the vehicles is potentially at risk, an alarm is triggered in this vehicle. However, a solution for resolving complex situations between an automatically driving vehicle and a further road user cannot be gathered from the document US 2015/0158499 A1.

The document DE 10 2013 226 336 A1 proposes a method for communicating between autonomously driving vehicles and people. In this case, a vehicle detects a road user from recorded environmental data. If there is a need to communicate with the road user, an output to the road user is initiated. However, the method proposed in the document DE 10 2013 226 336 A1 can be used only as long as the automatically driving vehicle can itself resolve a situation. Therefore, a solution for resolving complex situations between an automatically driving vehicle and another road user, in which an external remote driver is involved, cannot be gathered from the document DE 10 2013 226 336 A1 either.

There is, therefore, a requirement to provide a possibility for enabling an operating point, which externally controls an automatically driving vehicle, to resolve complex situations.

The disclosed embodiments make this possible by a method for communicating between an operating point, which externally controls an automatically driving vehicle, and a further road user. The operating point (command center) is a point at which a remote driver can externally control (that is to say remotely control) the automatically driving vehicle. The operating point may be operated, for example, by a manufacturer of the vehicle or a mobility service provider (for example, vehicle rental company) or may be under the responsibility thereof. The operating point may be designed such that the remote driver can access and operate functions of the automatically driving vehicle (for example, acceleration, braking, steering, light system etc.). The operating point may also be designed such that the remote driver can access measured or calculated parameters of the vehicle.

For example, the external access to the vehicle may be authorized by a vehicle occupant. This may take place, for example, as a result of the fact that the vehicle occupant himself requested it when seeking help or the operating point suggests to the vehicle occupant that it should assume control, which is then confirmed by the vehicle occupant. It is, therefore, possible for the remote driver to access, for example, recordings from one or more cameras of the automatically driving vehicle or measured values from one or more other sensors (for example, speed, distance) of the automatically driving vehicle. The clearance for data areas may also have to be confirmed by a vehicle occupant in a dedicated manner. In this manner, it is the vehicle occupant's responsibility to decide which information he would like to make accessible to the operating point. For this purpose, the operating point may maintain a data connection to the automatically driving vehicle (for example, via a cellular network), for example.

The method comprises identifying the further road user. To determine the identity of the further road user, it is possible to resort to a multiplicity of different items of information. In addition to information which was obtained by the sensor system of the automatically driving vehicle, it is also possible to resort to information provided by the further road user or to information provided by the traffic infrastructure. In addition to a further vehicle (automatically driving or not), the further road user may also be persons.

In this case, the method also comprises setting up a communication connection between the operating point and the further road user. A remote driver in the operating point may make contact with the further road user and may interchange information with the latter via the communication connection. This can also possibly be carried out only after the consent of one of the vehicle occupants (if present). The communication channel may comprise both the transmission of voice and the transmission of other information. In this manner, the operating point, which externally controls the automatically driving vehicle, can resolve complex traffic situations by agreement with the further road user, for example.

According to some exemplary embodiments, the identification of the further road user is based on received position information relating to the further road user and/or measured values from a sensor of the automatically driving vehicle and/or identification information emitted by the further road user. If, for example, the further road user is also registered with the operating point (for example, because it uses a vehicle from the same manufacturer or mobility service provider), the position information relating to the further road user may already be present on account of a continuous determination of the location of registered users, for example, with the result that it is possible to resort to this for identification. Alternatively or additionally, the identification may also be based on measured values from a sensor of the automatically driving vehicle.

For example, a license plate of the further road user may be recorded using a camera of the automatically driving vehicle and the identity of the further road user can be determined from the official license plate number. The further road user may also itself emit identification information. If the further road user is registered with the operating point, for example, it can emit a pseudonym which can be assigned to an identity by the operating point. The identification can also be carried out by an ITS (Intelligent Transport Systems) infrastructure on the roadside. This ITS infrastructure may belong to a traffic management center, for example, and as a result may have superordinate information. Using one or more of the above-mentioned items of information makes it possible to quickly and reliably identify the further road user.

In some exemplary embodiments, the method also comprises transmitting a measured value from a sensor of the further road user to the operating point via the communication connection. For example, during its communication with the remote driver in the operating point, the further road user can provide the remote driver with video images or other environmental information, for example, so that the remote driver can better assess the situation. As an alternative or in addition to acquiring information by a vehicle sensor system of the further road user, it is also possible to use, for example, a sensor system of a mobile terminal of the further road user (for example, camera of a smartphone or tablet computer of the further road user) (if the further road user has granted permission for this, for example).

According to some exemplary embodiments, the method also comprises transmitting information relating to a planned driving trajectory and/or a planned driving maneuver of the automatically driving vehicle to the further road user via the communication connection. Information relating to the planned driving behavior of the automatically driving vehicle can, therefore, be communicated to the further road user. Accordingly, the further road user can plan its further behavior. The planned driving trajectories or driving maneuvers can thereby be displayed visually on a display of a vehicle or mobile terminal of the further road user, for example, with the result that further information for resolving the traffic situation can be made available to the further road user. The information relating to planned driving trajectories or driving maneuvers of the automatically driving vehicle can also be transmitted to the further road user in addition to voice communication with the remote driver in the operating point.

In some exemplary embodiments, the further road user is a second automatically driving vehicle. In this case, the setting-up of the communication connection between the operating point and the further road user is a process of setting up a communication connection between the operating point, which externally controls the automatically driving vehicle, and a second operating point, which externally controls the second automatically driving vehicle. If a plurality of automatically driving vehicles are each externally controlled by remote drivers in an operating point, coordination can take place directly between the remote drivers. Resolution of a complex traffic situation can be simplified by the direct communication between the operating points or the remote drivers. In this case, the first operating point may differ from the second operating point, that is to say the two automatically driving vehicles are externally controlled by remote drivers in different operating points. However, the first operating point may also be identical to the second operating point. This may be the case, for example, if two remote drivers in a single operating point externally control the two automatically driving vehicles.

According to some exemplary embodiments, the method also comprises transmitting information relating to a planned driving trajectory and/or a planned driving maneuver of the automatically driving vehicle to the second operating point via the communication connection. Alternatively or additionally, the method also comprises transmitting information relating to a planned driving trajectory and/or a planned driving maneuver of the second automatically driving vehicle to the (first) operating point via the communication connection. Information relating to the planned driving behavior of the automatically driving vehicle or of the second automatically driving vehicle can be communicated in this manner to the respective other operating point (or the respective remote driver). Accordingly, the respective other operating point can plan or adapt its further behavior.

In some exemplary embodiments, the communication connection between the operating point and the further road user is effected via a mobile radio network. Mobile radio networks (for example, according to a 3rd Generation Partnership Project (3GPP) standard) are suitable for setting up the communication connection on account of their high degree of dissemination and availability. In addition, mobile radio networks may also provide the bandwidth needed to transmit data for the communication connection.

According to some exemplary embodiments, the communication connection between the operating point and the further road user comprises a local radio connection between the automatically driving vehicle and the further road user. For example, the automatically driving vehicle and the further road user may via a wireless local area network (WLAN; for example, according to the 802.11 standard or the 802.15.1 standard of the Institute of Electrical and Electronics Engineers, IEEE) or by vehicle-to-vehicle communication (car-2-car (C2C) communication, for example, according to the 802.11p standard of the IEEE). In this manner, the communication connection to the further road user can also be set up if the latter does not have access to the Internet or a mobile radio network, for example. In this case, the automatically driving vehicle may in turn be connected to the operating point by a mobile radio network, for example.

In some exemplary embodiments, the identity of the further road user is not communicated to a human operator (that is to say a remote driver) who externally controls the automatically driving vehicle in the operating point. An identity of the further road user can, therefore, be protected. The further road user may itself determine, during communication with the operating point, whether it wishes to disclose information relating to its identity to the human operator.

It goes without saying that exemplary embodiments also comprise a program having a program code for carrying out one of the methods described herein when the program code runs or is executed on a data processing system (for example, a backend, a computer cloud, a computer, a processor or a programmable hardware component).

According to another disclosed embodiment, it is possible to resolve complex situations by an automatically driving vehicle comprising a communication apparatus. In this case, the communication apparatus comprises a transceiver which is set up to set up a communication connection to an operating point which can externally control the automatically driving vehicle. In this case, the transceiver may be designed, for example, to establish a connection to a mobile radio network to set up or maintain the communication connection to the operating point.

The communication apparatus also comprises an input apparatus which is set up to receive communication to be transmitted to the operating point by the communication connection. The input apparatus may be, for example, a microphone, a keyboard or a touch-sensitive display. The input apparatus may be an apparatus (for example, of an infotainment system or a hands-free device) which is already present in the automatically driving vehicle.

The communication apparatus also comprises an output apparatus which is set up to output communication received via the communication connection from the operating point. The input apparatus may be, for example, a loudspeaker or a display. The input apparatus may be an apparatus (for example, of an infotainment system or a hands-free device) which is already present in the automatically driving vehicle.

The disclosed vehicle can make it possible to communicate with an operating point which externally controls the vehicle. In this manner, a remote driver can communicate with occupants of the automatically driving vehicle to obtain information relating to the current traffic situation or else to inform the occupants of planned driving maneuvers, for example.

FIG. 1 shows a method 100 for communicating between an operating point, which externally controls an automatically driving vehicle, and a further road user. The method 100 comprises identifying 102 the further road user and setting up 104 a communication connection between the operating point and the further road user.

The method 100 can make it possible, for example, to transmit voice from the operating point (command center) of an L4 vehicle to other road users with the aid of a local radio technology (for example, WLAN). In this case, the L4 vehicle may be used as a type of proxy or repeater. Alternatively, communication partners may be connected to one another with the aid of a mobile radio technology and the operating point (which is used as a type of switching center, for example).

Road users may register, for example, with the switching center for the service of coordination with automatic vehicles. In this case, the service may comprise, inter alia:
  managing registered users;
  determining the location of registered users;
  assigning the communication partners, for example, on the basis of a determination of the location and further properties suitable for identifying individual road users (for example, emitted pseudonym, information captured using a camera such as the license plate number),
  managing changing assignment features, for example, changing pseudonyms,
  initiating the communication and in the process ensuring the privacy of the road users registered for the service,
  creating a profile with personal preferences (for example, driving style or appointment calendar, to take this into account when selecting the trajectory) or anonymous information relating to vehicle properties or vehicle usage habits.

The communication between a remote driver in the operating point and another road user can be initiated by the remote driver or else by the other road user. The other road user may generally be the driver of a vehicle (for example, automobile, truck, commercial vehicle, two-wheeled vehicle, tram, emergency vehicle etc.) or else a pedestrian and a person controlling the traffic.

As indicated above, the (required) local cooperation partners can be identified with the aid of a local radio technology, for example, using pseudonyms used there.

Voice communication between a road user and the operating point can be initiated, for example, via mobile radio or alternatively with the aid of a local radio technology (for example, WLAN). The addressing can be carried out with the aid of pseudonyms, for example. The setting-up of a virtual private network (VPN) to ensure the privacy may also be included.

In the case of a central approach and use of a mobile terminal belonging to the user, it may be necessary to assign the user to the vehicle. In the case of a plurality of mobile terminals with the service switched on in the vehicle (for example, mobile terminal belonging to the driver and mobile terminals belonging to other passengers), the driver mobile device or the mobile device belonging to the vehicle occupant responsible for driving (since it is actually not possible to refer to a driver in the conventional sense) is automatically assigned, for example. For this purpose, it is possible to allocate, for example, roles (for example, by software or an application in the mobile terminal) which can be assumed by a mobile terminal in place of its user. For example, a mobile terminal may assume the role of a driver of a vehicle of the type XY (for example, automobile, truck, bus, motorized two-wheeled vehicle, unmotorized two-wheeled vehicle, passenger of a vehicle, pedestrian). The current roles of the mobile terminals can be transmitted to the operating point which manages the roles.

In the case of a plurality of L4 vehicles involved, for example, voice can be transmitted from the operating point of one L4 vehicle to the operating point of the other L4 vehicle according to the method 100. The communication can take place directly between the operating points or indirectly using local radio communication between the L4 vehicles which in this case are used as a type of proxy.

The method 100 may also comprise providing a remote driver in the operating point with sensor information (for example, video image). For example, during its communication with the remote driver, a road user provides the latter with video images or other environmental information so that the remote driver can better assess the situation. The capture can be effected, for example, using an on-board sensor system or a sensor system of a mobile terminal (for example, camera of the smartphone). It is also possible to resort to information from the roadside infrastructure, for example, ITS roadside stations (IRS), which can be provided by a responsible traffic management center, for example.

The method 100 may likewise comprise transmitting trajectories/maneuvers planned by the operating point of an L4 vehicle to other road users. The communication paths (local or central approach) described above can be used for this purpose.

The method may likewise also comprise transmitting trajectories/maneuvers planned by the operating point of an L4 vehicle to an operating point of another L4 vehicle. The communication can take place directly between the operating points or by local radio communication between the L4 vehicles which are used in this case as a type of proxy.

Further details of the method 100 are described above in connection with one or more exemplary embodiments. The method 100 may comprise one or more optional features according to one or more of the exemplary embodiments described above.

Figure 2:
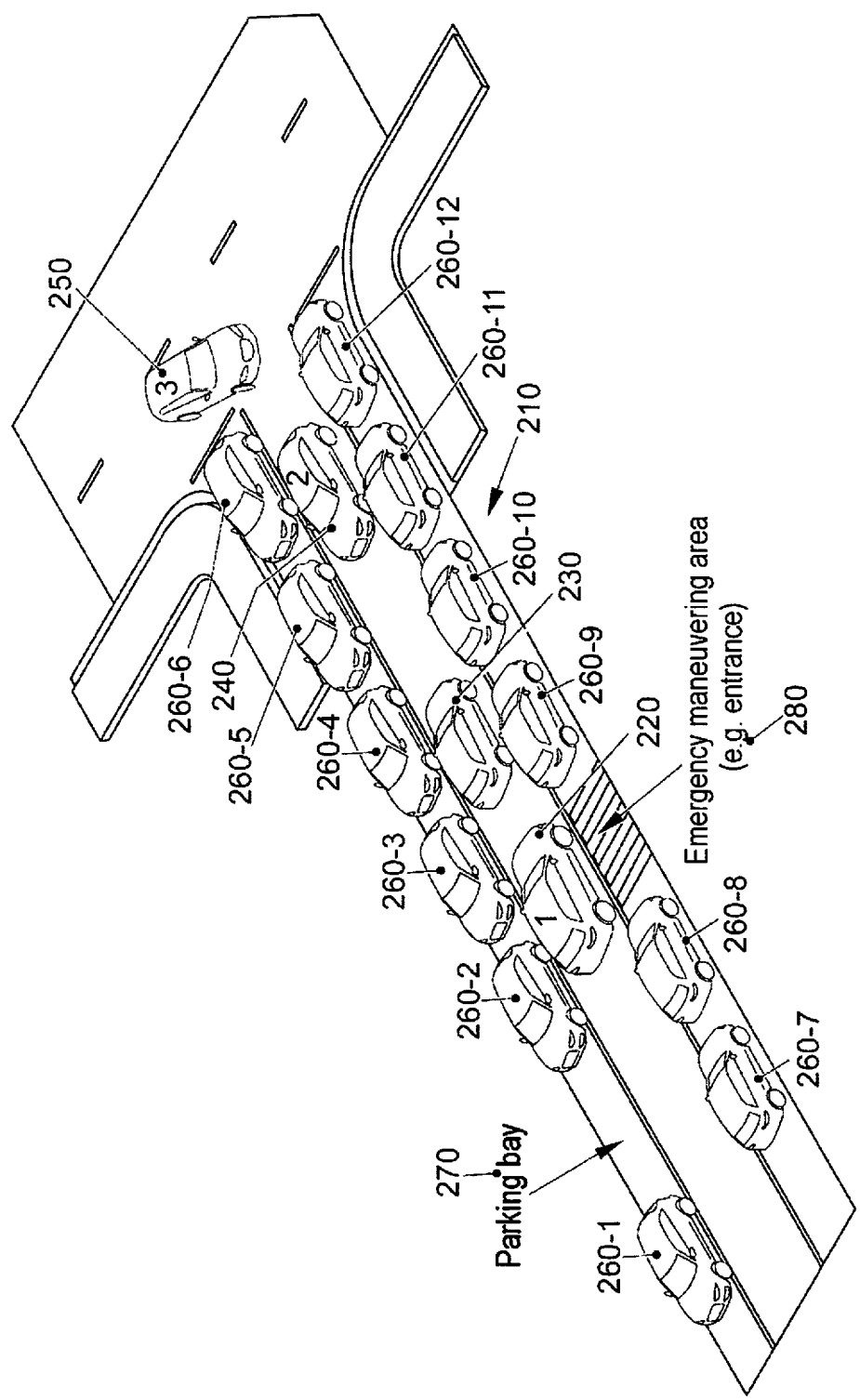
FIG. 2 shows an example of a complex traffic situation.

Hereinafter, FIG. 2 shows an example of a complex traffic situation 200 which can be resolved using the disclosed method. FIG. 2 shows a narrow road 210 with oncoming traffic. A situation has built up there which requires at least coordination of the four vehicles 220, 230, 240 and 250 for allowing emergency maneuvers and passing. Such coordination of the vehicles 220, 230, 240 and 250 may require intervention from a remote driver in an operating point, for example, if not all vehicles are highly automated (that is to say SAE Level 4 or higher).

In the complex traffic situation 200, only the vehicle 230 is highly automated (for example, according to SAE Level 4, that is to say without a human driver) and can be remotely controlled via an operating point. The further vehicles 220, 240 and 250 are vehicles with a low degree of automation or without automation (for example, SAE Level 3 or lower). The vehicles 260-1, . . . , 260-12 are not involved since they are parked on the roadside, for example.

To resolve the complex traffic situation 200, the vehicle 220, for example, can initially reverse into the parking bay 270. The L4 vehicle 230 can then reverse to the emergency maneuvering area 280 which may be formed by a property entrance, for example. The two vehicles 240 and 250 which have turned into the narrow road 210 can then pass. The L4 vehicle 230 can then leave the emergency maneuvering area 280 and can continue its journey. The vehicle 200 may likewise leave the parking bay 270 and may continue its journey.

To be able to resolve the complex traffic situation 200 as described above, the remote driver of the L4 vehicle 230 must (likely) agree maneuvers with the drivers of the other vehicles (for example, to carry out the operations described above).

For this purpose, the remote driver must make contact with the drivers of the manually controlled vehicles 220, 240 and 250 from the operating point. This requires a communication channel to transmit voice or cooperative messages (intention, request, accept, sensor information such as video images). The disclosed method can make this possible according to exemplary embodiments. Communication can take place in a decentralized manner, for example, by an ad-hoc network (WLAN) between the vehicles or in a centrally controlled manner via a mobile radio technology.

In this case, the remote driver need not necessarily be situated in the operating point and may also be situated, for example, in situ in the vicinity of the automatically driving vehicle. For example, a policeman (or else a fireman) can control the L4 vehicle with the inclusion of the operating point(s) via local communication and can also use L4 vehicles as a proxy.

Contact could also be initiated by one of the road users affected.

Figure 3:
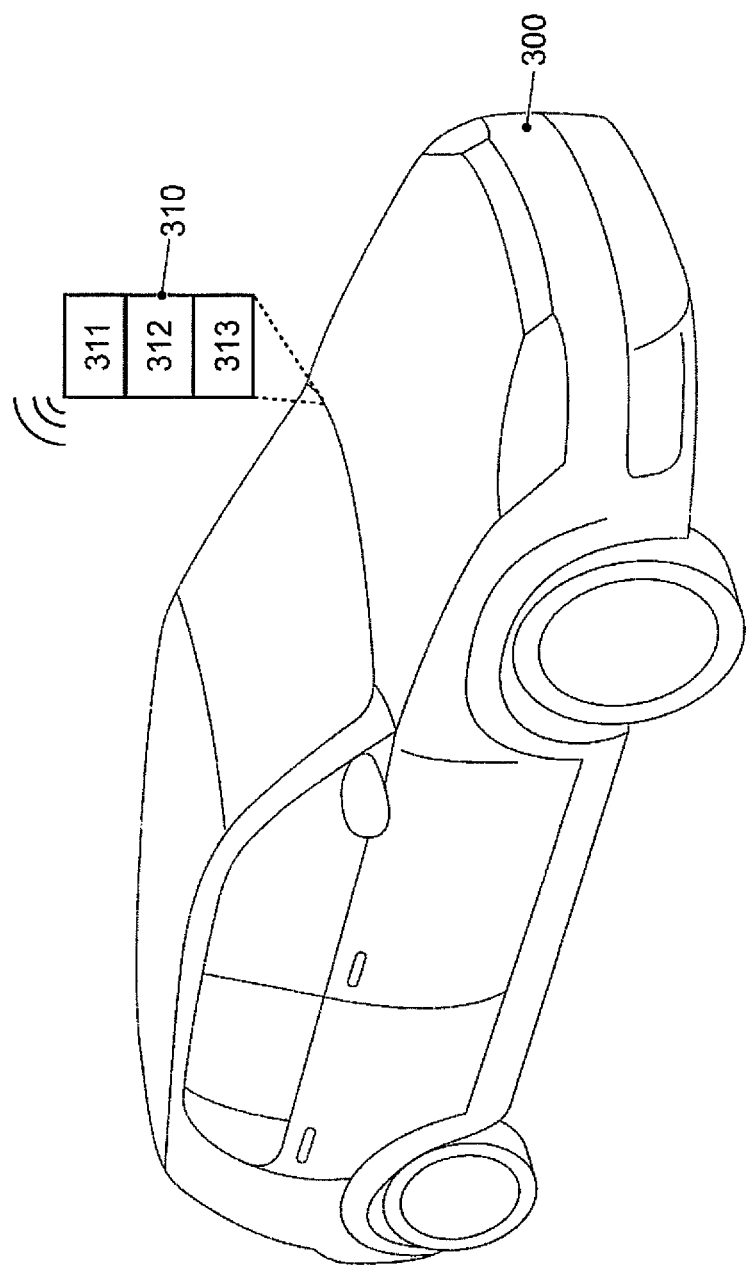
FIG. 3 shows an exemplary embodiment of an automatically driving vehicle comprising a communication apparatus.

FIG. 3 also shows an automatically driving vehicle 300 comprising a communication apparatus 310. The communication apparatus 310 comprises a transceiver 311 which sets up a communication connection to an operating point which can externally control the automatically driving vehicle 300. In this case, the transceiver 311 may be designed, for example, to establish a connection to a mobile radio network to set up or maintain the communication connection to the operating point.

The communication apparatus 310 also comprises an input apparatus 310 which receives communication which is to be transmitted to the operating point by the communication connection. The input apparatus 312 may be, for example, a microphone, a keyboard or a touch-sensitive display. An input apparatus (for example, of an infotainment system or a hands-free device) which is already present in the vehicle 300 can be used.

The communication apparatus 310 also comprises an output apparatus 313 which outputs communication received via the communication connection from the operating point. The output apparatus 313 may be, for example, a loudspeaker or a display of the vehicle 300. An output apparatus (for example, of an infotainment system or a hands-free device) which is already present in the vehicle 300 may again be used.

The vehicle 300 can enable communication with an operating point which externally controls or can control the vehicle 300. In this manner, a remote driver can communicate with occupants of the automatically driving vehicle 300.

For example, the communication apparatus 310 may be a communication device in an L4 vehicle having an operating panel, a microphone and a loudspeaker for communication between persons and the operating point or the remote driver situated there.

Further details of the automatically driving vehicle 300 are described above in connection with one or more exemplary embodiments. The automatically driving vehicle 300 may comprise one or more optional features according to one or more of the exemplary embodiments described above.

LIST OF REFERENCE SYMBOLS

100 Method for communicating between an operating point and a further road user
102 Identify the further road user
104 Set up a communication connection
200 Complex traffic situation
210 Narrow road
220 Vehicle
230 Vehicle
240 Vehicle
250 Vehicle
260-1, . . . , 260-12 Vehicles
270 Parking bay
280 Emergency maneuvering area
300 Vehicle
310 Communication apparatus
311 Transceiver
312 Input apparatus
313 Output apparatus

The invention claimed is:

1. A method for communicating between an operating point, which externally controls an autonomous driving transportation vehicle, and a further road user, the method comprising:
identifying the further road user; and
setting up a communication connection between the operating point and the further road user,
wherein the identification of the further road user is based on received position information relating to the further road user and/or measured values from a sensor of the autonomous driving transportation vehicle and/or identification information emitted by the further road user,
wherein the further road user is a second autonomous driving transportation vehicle, and
wherein the setting-up of the communication connection between the operating point and the further road user is a process of setting up a communication connection between the operating point, which externally controls the autonomous driving transportation vehicle, and a second operating point, which externally controls the second autonomous driving transportation vehicle.

2. The method of claim 1, further comprising:
transmitting a measured value from a sensor of the further road user to the operating point via the communication connection.

3. The method of claim 1, further comprising:
transmitting information relating to a planned driving trajectory and/or a planned driving maneuver of the autonomous driving transportation vehicle to the further road user via the communication connection.

4. The method of claim 1, further comprising:
transmitting information relating to a planned driving trajectory and/or a planned driving maneuver of the autonomous driving transportation vehicle to the second operating point via the communication connection, or
transmitting information relating to a planned driving trajectory and/or a planned driving maneuver of the second autonomous driving transportation vehicle to the operating point via the communication connection.

5. The method of claim 1, wherein the communication connection between the operating point and the further road user is effected via a mobile radio network.

6. The method of claim 1, wherein the communication connection between the operating point and the further road user comprises a local radio connection between the autonomous driving transportation vehicle and the further road user.

7. The method of claim 1, wherein the identity of the further road user is not communicated to a human operator who externally controls the autonomous driving transportation vehicle in the operating point.

8. An autonomous driving transportation vehicle comprising a communication apparatus, the communication apparatus comprising:
a transceiver to set up a communication connection to an operating point which externally controls the autonomous driving transportation vehicle;
an input apparatus to receive communication for transmission to the operating point by the communication connection; and
an output apparatus to output communication received via the communication connection from the operating point,
wherein communication between the operating point and the further road user includes identification of the further road user and setting up the communication connection between the operating point and the further road user, wherein the identification of the further road user is based on received position information relating to the further road user and/or measured values from a sensor of the automatically driving vehicle and/or identification information emitted by the further road user, wherein the further road user is a second autonomous driving transportation vehicle, and the setting-up of the communication connection between the operating point and the further road user is a process of setting up a communication connection between the operating point, which externally controls the autonomous driving transportation vehicle, and a second operating point, which externally controls the second autonomous driving transportation vehicle.

9. The autonomous driving transportation vehicle of claim 8, wherein the communication includes transmitting a measured value from a sensor of the further road user to the operating point via the communication connection.

10. The autonomous driving transportation vehicle of claim 8, wherein the communication includes transmitting information relating to a planned driving trajectory and/or a planned driving maneuver of the autonomous driving transportation vehicle to the further road user via the communication connection.

11. The autonomous driving transportation vehicle of claim 8, wherein the communication includes:
   transmitting information relating to a planned driving trajectory and/or a planned driving maneuver of the automatically driving vehicle to the second operating point via the communication connection, or
   transmitting information relating to a planned driving trajectory and/or a planned driving maneuver of the second autonomous driving transportation vehicle to the operating point via the communication connection.

12. The autonomous driving transportation vehicle of claim 8, wherein the communication connection between the operating point and the further road user is effected via a mobile radio network.

13. The autonomous driving transportation vehicle of claim 8, wherein the communication connection between the operating point and the further road user comprises a local radio connection between the autonomous driving transportation vehicle and the further road user.

14. The autonomous driving transportation vehicle of claim 8, wherein the identity of the further road user is not communicated to a human operator who externally controls the autonomous driving transportation vehicle in the operating point.

\* \* \* \* \*